(No Model.) 2 Sheets—Sheet 1.
B. H. STANDISH.
ELECTRIC BELT.
No. 501,849. Patented July 18, 1893.
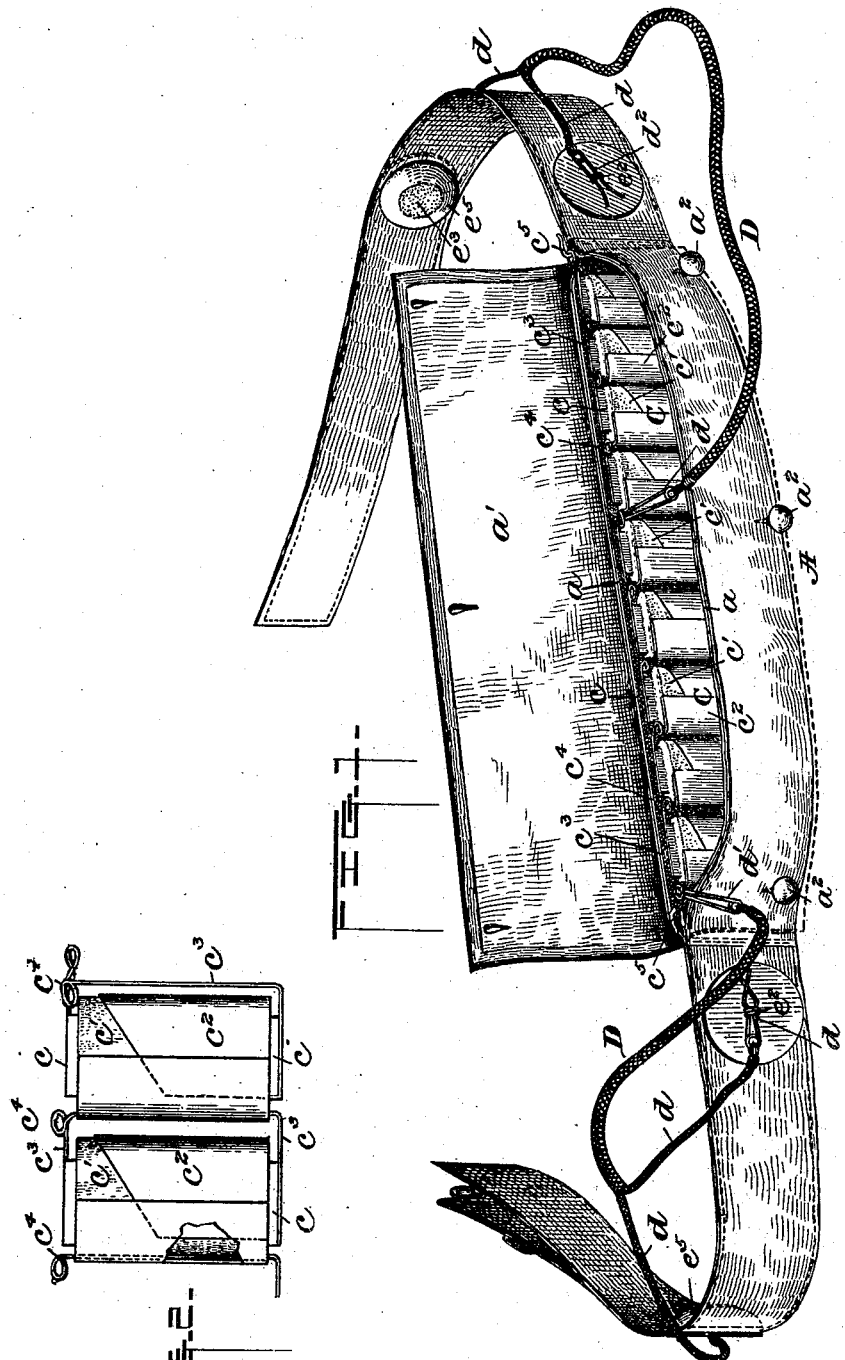
Witnesses
Gabe P. Moore
Paul L. Clark
Inventor
Barney H. Standish
By Chas. L. Sturtevant.
Attorney

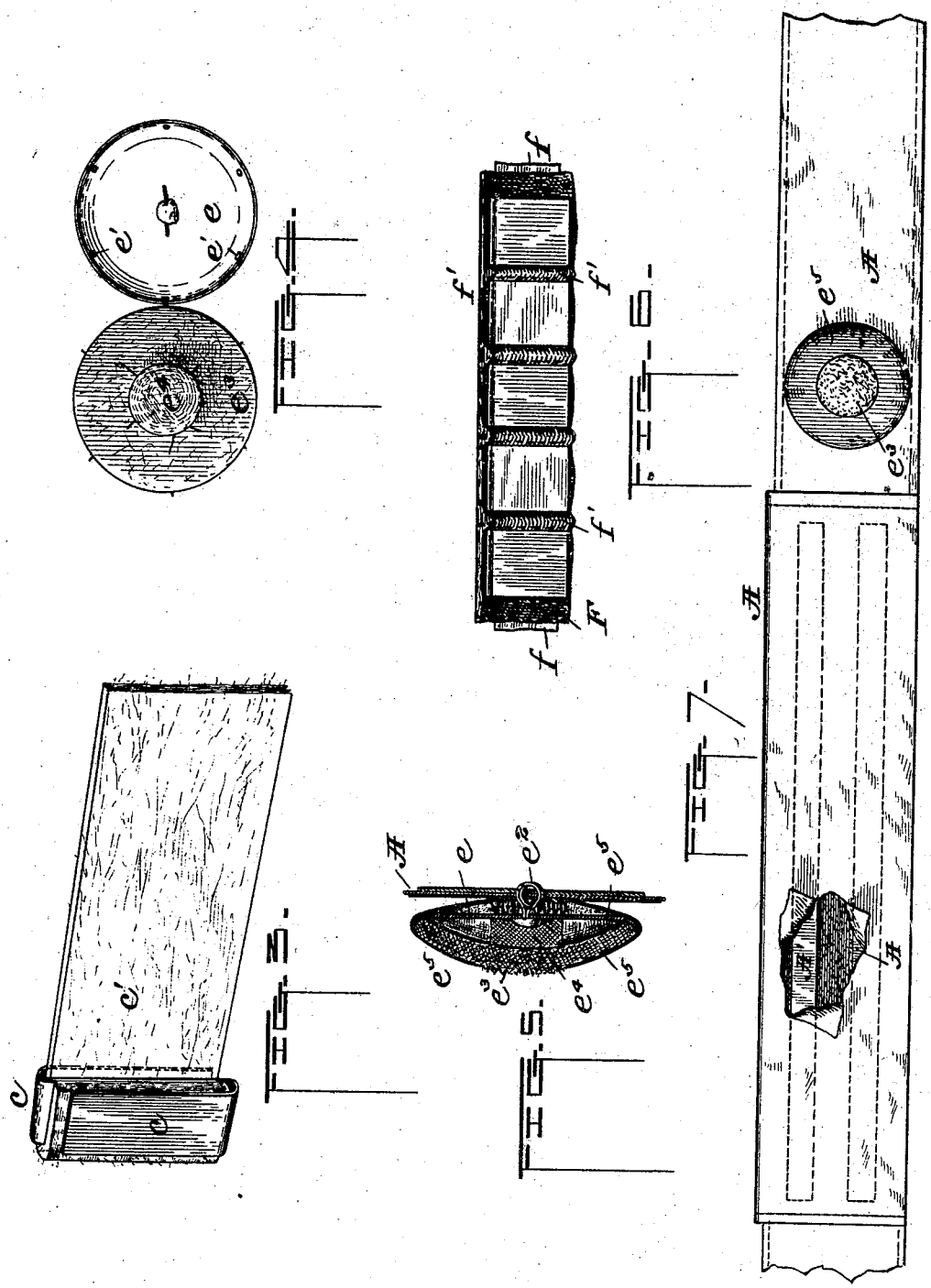

UNITED STATES PATENT OFFICE.

BARNEY H. STANDISH, OF EVANSVILLE, WISCONSIN.

ELECTRIC BELT.

SPECIFICATION forming part of Letters Patent No. 501,849, dated July 18, 1893.

Application filed October 24, 1892. Serial No. 449,855. (No model.)

*To all whom it may concern:*

Be it known that I, BARNEY H. STANDISH, a citizen of the United States, residing at Evansville, in the county of Rock and State of Wisconsin, have invented certain new and useful Improvements in Electric Belts, of which the following is a description, reference being had to the accompanying drawings, and to the letters of reference marked thereon.

This invention relates generally to electric belts.

The objects of my invention are to provide first a novel form of battery which is arranged within a waterproof pocket attached to the belt proper; secondly to provide a novel means for securing the battery taut within the pocket; thirdly to provide for regulating the current, and equally distributing the same at various points, and fourthly to provide a novel form of electrode which is adapted to be moistened and remain so thereby increasing the effect of the current and decreasing the discomfort at the point of contact with the body.

With these various objects in view, my invention consists in the peculiar construction of the several parts and their novel combinations or arrangement, all of which will be fully described hereinafter and designated in the claims.

In the drawings, forming a part of this specification Figure 1 is a perspective view of the belt showing the pocket open, exposing the battery, and connection, the front and rear of the electrodes, the magnets being shown in dotted lines. Fig. 2 is a detail view of two of the cells. Fig. 3 is a detail view of the cell illustrating the manner of making the same. Fig. 4 is a detail view showing the parts of the electrode, and Fig. 5 is a sectional view of a complete electrode and connections. Fig. 6 is a detail view of the supplementary battery used in a suspensory bandage. Fig. 7 is a rear view of the belt, partly in section.

In the practical embodiment of my invention I employ a belt of any suitable material and to the outer side, either at the rear or at the sides (one at the rear or two at the sides) I attach pockets A. Each pocket is of double thickness having an inner lining $a$ of rubber or other waterproof material. The pocket A is also provided with a suitable flap $a'$ which is secured by means of the buttons $a^2$ as clearly shown in dotted line, Fig. 1.

C indicates the battery located within its waterproof pocket and consisting of a series of zinc copper cells each comprising a central plate of zinc $c$, a pocket of felt $c'$ to receive the exciting fluid, and an outer cylinder $c^2$ of copper.

In preparing the cell the zinc plate is bent or folded upon the felt strip, and the free end of said strip wrapped around the plate so bent thus making an inner and outer packing. In the lowest power battery however a single unbent bar is used. As the strength of a battery depends largely upon the amount of zinc exposed a longer plate can be used when desired in which case it is folded several times, the felt passes between each fold and is then wrapped around the folded plate and felt, thus greatly increasing the strength of the battery without an appreciable increase in expense or labor. The cells are connected by means of copper wires $c^3$ which are passed between the copper cylinder and felt packing of one cell and have their ends soldered to the upper and lower ends of the zinc plate of the next adjacent cell. The upper portion of this wire is also twisted to provide an eye $c^4$ for the purpose of receiving the connector upon the end of the conductor wire as hereinafter explained. The wires of the end cells are formed with two eyes as clearly shown, the outer ones of which are adapted to engage hooks $c^5$ secured at the ends of the pocket A, which hooks and eyes secure the battery within said pocket and prevent any displacement, and also secure constant connection by keeping the battery taut.

D D indicate the conductor wires which extend from opposite poles of the battery, each of said conductors being composed of two wires $d$ $d$, wrapped together for the greater portion of their lengths but near their outer ends are separated, each end being connected with an electrode E thereby distributing the current equally at different points on the body. The inner end of each conductor D is provided with a spring connecting device $d'$ by means of which the conductor can be readily detached from one cell and attached to another thereby regulating the strength of the current. These connecting devices consist simply of a single piece of spring wire coiled centrally to provide an eye and also to throw the free ends or arms apart, which ends or arms are adapted to be inserted in the eyes $c^4$ produced upon the wires $c^3$, and to prevent their escape the outer ends of said arms are bent up as clearly shown. The outer end of each wire $d'$ is also provided with a spring contact device $d^2$ similar in general construction to $d'$, but formed with intermediate offset portions instead of the end hooks. These contact devices $d^2$ are adapted to connect with the electrodes and in consequence of their construction are readily attachable to and detachable from the same.

My electrodes are of novel construction, being adapted to receive and retain a moistening fluid which greatly increases the electric effect upon the body.

In constructing my electrodes I employ a concavo convex metallic plate, $e$ (preferably German silver nickel plated) and near the edges of the same produce a series of perforations $e'$. A metallic eye $e^2$ is passed centrally through the plate and soldered thereto, the eye being arranged upon the convex surface. On the concave face is arranged and secured a felt disk $e^3$ which is stitched to the perforated plate and given a convex shape by means of a central felt padding $e^4$ arranged between the disk $e^3$ and plate $e$. The electrode thus far constructed is then covered with a rubber cloth $e^5$ cut away centrally to expose a portion of the felt $e^3$, the rubber being gathered beneath the plate $e$ as clearly shown in Figs. 4 and 5. The eye $e^2$ is passed through the belt from the inner side and is engaged by the spring contact devices upon the ends of the wire $d$. Washers are preferably arranged upon both the inner and outer sides of the belt where the electrode is secured. It will thus be seen that the electrode can be easily attached to and detached from the belt. The electrode is intended to be moistened and the padding $e^4$ besides giving shape to the electrode also serves as a support leaving the free portion of the saturated disk to act as a water reservoir, thereby rendering the same effective for a greater length of time and, of course, said electrode can be used elsewhere than in an electric belt, e. g., in trusses, suspensory sacks, &c.

F indicates the supplementary suspensory battery consisting of alternate zinc and copper plates bent over a strip of leather $f$, having a strip of superimposed felt $f'$. The felt is drawn up in folds between the joints of the plates and fastened by stitches.

Any suitable exciting fluid may be used with my improved belt.

From the above description it will be seen that I provide a novel belt: that I provide a peculiar form of battery within a waterproof pocket, and also that the current can be regulated as to strength and distribution. And it will be further seen that by means of the electrode described and shown the electrical effect upon the body is greatly increased.

Having thus described my invention, what I claim is—

1. In an electric belt, the combination with a belt proper of a pocket secured thereto, hooks secured at the ends of the pockets, a battery within said pockets having a series of cells, connecting wires between the cells having eyes formed therein, conductor wires adapted to be connected with the said eyes, the connecting wires of the battery terminating at each end thereof in an eye adapted to fit over the hooks; substantially as described.

2. In an electric belt, the combination with a belt proper, of a pocket secured thereto, hooks secured at the ends of the pocket, a battery attached to the hooks and located within the pocket, a series of cells composing said battery, connecting wires between the cells having eyes formed thereon, and detachable conductor wires having devices for connecting them with said eyes, said connecting device consisting of a piece of spring wire coiled centrally to provide an eye, and having spring arms adapted to be inserted through the battery eyes and bent outwardly to prevent accidental displacement; substantially as described.

3. In an electric belt, a battery composed of a central plate of zinc, a pocket of felt, and an outer cylinder of copper, the zinc plate being bent or folded upon the felt strip which forms the pocket, the free end of said strip being wrapped around the bent plate, and a connecting wire soldered to the upper and lower ends of the zinc plate; substantially as described.

4. An electrode composed of a metallic plate, an absorbent disk secured thereto, and a combined shaping and reservoir packing interposed between the plate and disk; substantially as described.

5. An electrode consisting of a metallic plate having an eye, a felt disk secured to the same, the felt packing and a covering, all arranged substantially as shown and described.

6. In an electric belt, in combination with conductor wires, an electrode comprising a metallic plate having an eye passed through the belt, a felt disk secured to the plate, a felt packing and suitable covering, and a spring contact device on the conductor wires securing the eye to the belt; substantially as described.

In testimony whereof I affix my signature in presence of two witnesses.

BARNEY H. STANDISH.

Witnesses:
GEO. L. PULLEN,
ROBT. D. HADLEY.